3,822,134
VACUUM DEPOSITED RADIATION-SENSITIVE ELEMENTS

Arthur A. Rasch, Webster, and Wilbur C. Hodges, Rochester, N.Y., assignors to Eastman Kodak Company, Rochester, N.Y.
No Drawing. Filed Jan. 17, 1972, Ser. No. 218,545
Int. Cl. G03c 1/72
U.S. Cl. 96—94 R     35 Claims

ABSTRACT OF THE DISCLOSURE

Polyacetylenic compounds can be vacuum deposited upon a support to form elements which are highly sensitive to ultraviolet and electron beam radiation. Codeposition of polyacetylenic compounds and a sensitizing material, such as a silver halide, results in sensitization of the polyyne in the visible region.

BACKGROUND OF THE INVENTION

Field of the invention

In general, this application relates to radiant energy sensitive elements comprising a support bearing a crystalline polyacetylenic compound, and the method for the preparation and use thereof. Further, this application relates to vacuum deposition of polyacetylenic compositions upon a support, and the codeposition of sensitizing materials therewith. More particularly, this application relates to the codeposition, in vacuum, of a polyacetylenic composition and a silver halide, said silver halide extending the spectral sensitivity of said polyacetylenic composition.

Description of the prior art

Numerous polyacetylenic compositions of matter are reported in the literature, along with some observation of light sensitivity. Included among investigators reporting on polyyne composition are: Arthur Seher; Ferdinand Bohlmann and his coauthors; and E. R. H. Jones and M. C. Whiting and their coauthors. The photosensitive polyacetylenic compounds disclosed in the literature generally contain a minimum of two acetylenic linkages as a conjugated system (i.e., —C≡C—C≡C—) and, with only a few exceptions, carbon atoms in alpha position to the acetylenic carbon atoms; i.e., those carbon atoms directly connected to the acetylenic carbon atoms are bonded directly only to carbon and/or hydrogen atoms. These photosensitive polyacetylenic compositions of matter encompass diynes, triynes, tetraynes, higher polyynes, and numerous derivatives and related compounds thereof of various chemical classes ranging from hydrocarbon compounds to acids, esters, diols, and to still other compounds of other chemical classifications containing numerous and varied organic radicals.

As is apparent from publications of the aforementioned investigators, methods are known in the art for the preparation of polyacetylenic compositions. Methods are taught in U.S. Pats. 2,816,149; 2,941,014; 3,065,283; etc. General preparative methods include oxidative coupling or oxidative dehydrocondensation reactions of numerous terminal acetylenic compounds to prepare, as desired, symmetrical and unsymmetrical polyyne compounds; dehydrohalogenation reactions to provide compounds containing acetylenic bonds; and variations, modifications, and combinations of such two basic reactions to provide preparative routes for a multitude of polyacetylenic compositions of matter.

From the preceding description of the art and the sources therein mentioned, there are apparent numerous polyyne compounds which may be used in this invention. For some there is a brief mention of photosensitivity, while for others nothing is reported as to photosensitivity. However, it is within the skill of the art to readily evaluate photosensitivity where the same is unknown. Thus, one needs merely to expose samples of a prepared crystalline polyacetylenic composition of matter to various forms of radiant energy and upon exposure to observe whether a visible color change occurs in the exposed condition. If a visible color change occurs upon exposure to a form of radiant energy, then the crystalline polyacetylenic composition of matter is deemed photosensitive, for purposes of the present invention, to that specific form of radiant energy. The term photosensitivity, as employed herein, is intended to denote sensitivity to any of the various forms of radiant energy.

Radiant energy, as used herein, is intended to include numerous variant forms of radiant energy, encompassing not only the ultraviolet and visible regions (i.e. actinic radiation) and infrared region of the electromagnetic spectrum, but also electron beams, such as developed by cathode ray guns, gamma-rays, X-rays, beta-rays, electrical corona discharge, and other forms of corpuscular and/or wave-like energy generally deemed to be radiant energy. The various individual crystalline polyacetylenic compositions of concern generally are not responsive to all such forms of radiant energy, but selectively respond to at least one or more of several variant forms thereof. Within the numerous and varied useful crystalline polyacetylenic compositions of matter, some respond rapidly and selectively to certain radiant energy forms, and slowly or not at all to other forms of radiation. Most frequently, response to a particular form of radiation is greatest, and most rapid, at particular narrow regions and wavelengths of the electromagnetic spectrum. Generally, the preferred polyacetylenic compositions are most sensitive to radiation within the ultraviolet region.

In the past, image-recording elements utilizing radiation-sensitive polyacetylenic compounds have been prepared by fixing a crystalline polyacetylenic compound upon a surface. This has been done, for example, by coating a dispersion of the polyyne in a polymer matrix on a suitable support, by coating a solution of the polyyne in a polymer solution and allowing the polyyne to crystallize upon solvent evaporation, by applying a solution of a polyyne to a substrate and allowing the polyyne to crystallize thereupon, by coating a dispersion of a water-immiscible polyyne solution in an aqueous binder and allowing polyyne crystals to form in the binder matrix upon evaporation of the solvent, or by simply smearing the polyyne on a suitable support. Although the prior art discloses binderless layers of polyacetylenic compounds upon a substrate, such layers have in the past been prepared by crystallization from a solvent. Such layers tend to be large grained, and to have poor stability.

It has now been learned that layers of the same compounds, prepared by vapor deposition in vacuum, have much finer grain structure, and have much greater stability when stored. It is possible therefore, to produce images having greater sharpness and contrast than images produced by layers prepared by prior art techniques. Finer grained materials are produced by the evaporation process, and as a result, images produced on them (particularly by the electron beam of a cathode ray tube) have higher resolution than can be produced on coarser grain materials produced by coating from a solution. The coatings prepared by evaporation do not deteriorate when stored, and the layers produced by the technique of this invention are found to be more sensitive to electron beam radiation than layers prepared by other techniques. Further, it is possible to sensitize vacuum deposited polyacetylene layers by the codeposition therewith of a sensitizing material.

It is therefore an object of this invention to provide radiation-sensitive polyacetylenic elements having improved sensitivity and stability. It is a further object of this invention to provide radiation-sensitive elements comprising vacuum deposited polyacetylenic compounds.

It is a further object of this invention to provide a technique for the sensitization of polyacetylenic compositions of matter. And still further, it is an object of this invention to provide a process for the sensitization of vacuum deposited polyacetylenic elements by codeposition therewith of sensitizing materials. And more specifically, it is an object of this invention to provide photosensitive elements comprising a polyacetylenic compound vacuum codeposited with a silver halide.

SUMMARY OF THE INVENTION

These and other objects are obtained by the practice of this invention, which invention resides in the vacuum deposition of radiation-sensitive polyacetylenic compounds upon a suitable substrate. Elements prepared in this manner may be spectrally sensitized by the codeposition of a sensitizing material, such as a silver halide, with the polyacetylenic compound.

Elements prepared in accordance with the present invention may comprise many suitable support materials. Exemplary support materials include: vitreous materials, such as glass, glazed ceramics, porcelain, etc.; fibrous materials such as cardboard, fiberboard, paper including bond paper, resin and clay-sized papers, wax or other transparentized paper, paperboard, etc., cloths and fabrics including those of silk, cotton, viscose rayon, etc.; metals, such as copper, bronze, aluminum, tin, etc.; natural polymers and colloids, such as gelatin, polysaccharides; natural and synthetic waxes including paraffin, beeswax, carnauba wax; synthetic resins and plastics, including particularly polyethylene, polypropylene, polymers and copolymers of vinylidene and vinyl monomers including polyvinyl chloride, polyvinylidene chloride, vinyl chloride/vinyl acetate, vinyl acetate/acrylate, vinyl acetate/methacrylate, vinylidene chloride/acrylonitrile, vinylidene chloride/vinyl acetate, vinylidene chloride/methacrylate, polystyrenes, polyvinyl acetals including polyvinyl butyral, polyvinyl formal, polyvinyl alcohol, polyamides including polyhexamethylene adipamides. N-methoxymethyl polyhexamethylene adipamide, natural and synthetic rubbers including butadiene-acrylonitrile copolymers, 2 - chloro - 1,3 - butadiene polymers, polyacrylate polymers and copolymers including polymethylmethacrylate, polyethylmethacrylate, polyurethanes, polycarbonates, polyethylene terephthalate, polyethylene terephthalate/isophthalate copolymers and other esters as by condensing terephthalic acid and its derivatives with propylene glycol, diethylene glycol, tetramethylene glycol or cyclohexane-1,4-dimethanol, cellulose ethers including methyl cellulose, ethyl cellulose and benzyl cellulose, cellulose esters and mixed esters including cellulose acetate, cellulose triacetate, cellulose propionate, cellulose nitrate and cellulose diacetate; and even non-thermoplastic materials including cellulose, phenolic resins, melamine-formaldehyde resins, alkyd resins, thermosetting acrylic resins, epoxy resins, and numerous other synthetic resins and plastics as will be apparent to those skilled in the art.

The base or support may be transparent, translucent, or opaque, and should be selected with due consideration being given to the particular radiant energy to which the employed crystalline polyacetylenic compound is sensitive. It is also selected with due consideration of the intended usage of the image element and of the specific radiant energy and technique to be employed in the particular image-recording application. For example, through proper selection of support, polyacetylenic material, and coating techniques, it is possible to prepare transparent elements suitable for projection viewing. For example, where the imaging technique requires transmission of ultraviolet radiant energy through the support material to expose the polyacetylenic crystals, the support should possess such a transmission characteristic and may be a cellulose acetate butyrate, cellulose acetate, polyvinyl alcohol, polyvinyl butyral or other suitable transparency. The support material may be adhered directly to the photosensitive crystals, or indirectly adhered, if desired, by a subbing layer or coating on the support for any of several purposes, e.g., to alter the support's transmission of the radiant energy, to change the support's reflectivity of the radiant energy, to modify adherence to the support, and for other reasons. Similar to the base or support material, such subbing layer is selected with due regard to the specific radiant energy and technique to be employed in the particular image-recording application. Subbing layers for various photographic purposes and methods of coating supports with the same are well known.

Generally and preferably the element is a flat film, sheet, plate or the like so as to present a flat surface upon which the radiant energy may be directed. However, curved-surface and other than flat-surfaced elements, although generally of lesser utility, are not excluded.

Illustrative and representative of the polyacetylenic compositions of matter suitable for utilization in the process and elements of this invention are those disclosed in U.S. Pats. 3,501,297; 3,501,302; 3,501,303; and 3,501,308. The polyacetylenic compositions described therein include crystalline acid derivatives, and in particular, certain esters and salts of dicarboxylic-terminated polyacetylenic compounds having the structural formula

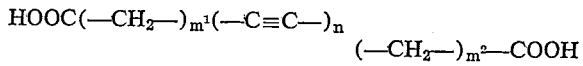

wherein $n$ is an integer of at least 2 and $m^1$ and $m^2$ are integers, not necessarily the same but preferably the same, greater than 5 and less than 10. The preferred radiation-sensitive crystalline acid derivatives disclosed by said patents include: the mono- and diesters of these diacids, and especially of the symmetrical diacetylenic diacids, with particular preference for the lower alkyl esters, and most specifically the alkyl ester derivatives wherein the alkyl-ester moiety contains less than 3 carbon atoms; and alkali metal salts and acid derivatives of these diacids and their half-esters, particularly the potassium salt of the methyl half-ester of the preferred symmetrical diacetylenic diacids. Particularly preferred is the monomethyl ester of 10,12-docosadiyne dioic acid.

Further polyacetylenic compositions which are suitable for utilization according to this invention include alkyl-amide derivatives such as those which have the structural formula $A—(CH_2)_x—(C{\equiv}C)_n—(CH_2)_y—B$, wherein: $n$ is an integer greater than 1; $x$ and $y$ are each an integer from 0 to 10; A may be a methyl radical, either unsubstituted or substituted (such as methoxymethyl or ethoxymethyl), COOR, CONHR', CONHNHR'' or

and B is a radical selected from the group consisting of CONHR', CONHNHR'' and CONHCONHR'', wherein R may be H or an alkyl of less than 8 carbon atoms (e.g., methyl, propyl, pentyl, octyl, etc.), R' is an alkyl having from 2 to 12 carbon atoms, (e.g., propyl, butyl, octyl, decyl, undecyl, etc.), including substituted alkyls such as hydroxy, polyhydroxy, amino, substituted amino, alkyl thio, COOR, CONHR', or methoxy substituted alkyl, and R'' may be phenyl or an alkyl having from 2 to 12 carbon atoms. Preferred alkylamides of this nature include: methyl 21-[N-(3-carboxypropyl) carbamoyl]-10, 12-heneicosadiyne; methyl 21-[N-(3-hydroxypropyl) carbamoyl]-10,12-heneicoadiynoate; and methyl 21[N-(3-carboxypropyl) carbamoyl]-10,12-heneicosadiynoate.

Suitable radiation-sensitive crystalline polyacetylenic amine salts may have the structural formula

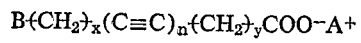

wherein: $n$ is an intger greater than 1; $x$ and $y$ are each an integer from 0 to 10; $A^+$ is selected from ammonium and substituted ammonium groups, (e.g., $\overset{+}{N}H_3R$, $\overset{+}{N}H_2RR^1$, $\overset{+}{N}HRR^1R^2$, $\overset{+}{N}RR^1R^2R^3$);

B is selected from the group consisting of $CH_3$, $COO^-A^+$, $COOR^4$, $CONHR^5$, $CONHNHR^6$, $CONHCONHR^6$, $R^7OOCNH$, and $R^7NHCOO$ radicals, wherein R, $R^1$, $R^2$, and $R^3$ may be the same or different, and may be H, alkyl (including hydroxy or methoxy substituted alkyl), or aryl, $R^4$ may be H or an alkyl of less than 8 carbon atoms (e.g., methyl, propyl, pentyl, octyl, etc.), $R^5$ is an alkyl of from 2 to 12 carbon atoms (e.g., propyl, butyl, octyl, decyl, undecyl, etc.), including substituted alkyl such as hydroxy, polyhydroxy, amino, substituted amino, alkyl thio, carboxy, or methoxy substituted alkyl, $R^6$ may be phenyl or an alkyl having from 2 to 12 carbon atoms, and $R^7$ is an alkyl, including methoxy or hydroxy substituted alkyls of from 1 to 8 carbon atoms, phenyl, or hydroxy substituted phenyl. Suitable polyacetylenic amine salts include hexylammonium 20-(N-hexylcarbamoyl)-9,11-eicosadiyne-1-carboxylate, propylammonium 20-(N-propylcarbamoyl)-9,11-eicosadiyne-1-carboxylate, and 3-hydroxypropylammonium 20-[N-(3-hydroxypropyl)-carbamoyl]-9,11-eicosadiyne-1-carboxylate.

Additional suitable polyacetylenic compounds include polyacetylenic bis urethanes corresponding to the formula $[R-NHCOO(CH_2)_nC\equiv C]_2$ wherein $n$ is an integer of 1 to 4, and R is selected from the group consisting of alkyl radicals of from 1 to 12 carbon atoms, including substituted alkyl radicals such as hydroxy, polyhydroxy, amino, substituted amino, or methoxy substituted alkyl, phenyl and substituted phenyl radicals (e.g., hydroxy, carboxy, and methoxy phenyl). Suitable members of this class of polyacetylenic compounds include 2,4-hexadiyne-1,6-diol bis(N-hexylurethane), and 2,4-hexadiyne-1,6-diol bis(N-butylurethane).

The evaporated layers need not be prepared from highly purified material, and, in fact, it is possible to prepare high-quality layers from degraded starting material that has partially polymerized and is not colorless. This avoids a purification step that may otherwise be necessary in the preparation of the polyacetylenic photosensitive composition. Furthermore, in preparing the layers no impurities are introduced into the coating such as might be introduced by solvents and polymeric addenda when coating from solution. It is theorized that this fact, at least in part, may explain the very high stability obtained in the thin films of polyyne produced by the vacuum deposition technique herein described. Effective coatings may be prepared having thicknesses of from about 250 A. to 15,000 A., with the preferred polyyne layer thickness being from about 1000 A. to about 6000 A.

In addition, another advantage of this invention is that coatings having unusual compositions and properties may be prepared by this process. For example, materials which will sensitize the diyne materials may be coevaporated with the diyne to form initimate or homogenous mixtures which are difficult to prepare by other means. The sensitivity of such mixtures may be considerably higher than that of similar mixtures produced by other techniques from the same compounds. In a similar manner, coatings of intimate mixtures of diynes of differing chemical structure may be produced, over a wide range and ratio of coverages, to produce elements having enhanced sensitivity and images of controlled color and contrast.

For the sensitization of vacuum deposited polyacetylenic compounds, a number of sensitizing materials are known. For example, it is possible to spectrally sensitize polyacetylenic compounds with organic pi-acid electron acceptors. It has now been found, surprisingly, that vacuum deposited polyynes may be sensitized to longer wavelength radiation by silver halides, as well. It is particularly to be noted, that elements in which silver halide is deposited in a separate and distinct layer, followed or preceded by vapor deposition of the polyyne, do not exhibit enhanced sensitivity to radiation of longer wavelength.

The silver halides preferred for codeposition with the polyacetylenic compounds hereinabove set forth include silver bromide, silver chloride, and silver iodide, although mixed silver halides, such as silver chlorobromide or silver bromoiodide are also suitable. The sensitizing silver halide may be present in a proportion of from about 5% to about 100%, based on the weight of the polyyne. The preferred range for silver halide concentration is from about 30% to about 70%, by weight, of the polyyne present.

Well-known sources, lenses and optical systems, camera arrangements, focusing and projection systems and the like for the various forms of radiant energy are used in employing the image-receptive element in the varied image-forming applications, such as specimen photography, pattern making, reproduction of written, printed, drawn, typed and the like matter, and the recording of line graphical images by an impinging pointed beam of the radiant energy on the element with either or both the element and pointed beam guided or traveling to trace the image. The resultant images are directly formed printout images in that they can be seen by the human eye to be a distinctly different color than unirradiated crystals of the element.

The radiation-sensitive image-receptive element may be used in image-forming systems based on transmission-exposure techniques and reflect-exposure techniques. Thus, stencils of a material substantially nontransmissive of the radiant energy may be laid on the image-forming element with the cut-out portion of the stencil allowing the applied radiant energy to strike the element according to the desired image or images. If desired, the stencil need not contact the element with the radiant energy being projected to pass through the cut-out portion of the stencil to strike the element. The element also can be exposed by contact or projection techniques through a two-tone image or process transparency, e.g., a process negative or positive (i.e., an image-bearing transparency consisting of areas transmissive and opaque to the radiant energy such as of a so-called line or halftone negative or positive-type transparency) or a continuous tone negative or positive. Likewise an object, whose image is to be obtained, may be placed between the radiant energy source and the element and the radiant energy striking the element will be of an image pattern dependent on the radiant energy absorption and transmission characteristics of the particular object. Reflex-exposure techniques are applicable. For example, by ultraviolet reflecting optic techniques, ultraviolet sensitive image-receptive elements may be used to make photocopies of printed or typed copy. Reflex-exposure techniques are particularly useful for making office copies from materials having messages on both sides of a page, for making images, of specimens and objects, and for reproducing messages and the like found on materials not having radiant energy transmissive properties conductive to transmission-exposure techniques.

Elements prepared in accordance with this invention are particularly suited for use as electron beam recording means. When such usage is contemplated, it is particularly advantageous to provide an ultraviolet radiation screening composition, to protect the polyacetylenic composition from ultraviolet radiation. Thus, electron beam recording elements may be provided having fine resolution, and low sensitivity to ultraviolet or visible radiation, and hence, a very high degree of stability. Such ultraviolet absorbers may be deposited on the support prior to deposition of the polyacetylenic compound, or in a separate layer overcoating the photosensitive layer, or both. Alternatively, an ultraviolet absorber may be codeposited with the polyacetylenic compound.

An important property of the imaged elements wherein the image has been produced by ultraviolet or electron beam radiation of a crystalline polyacetylenic composition, in the absence of a codeposited silver halide, is a reasonable stability and lack of photosensitivity to visible light. Thus, the directly produced visual print-out image can be printed out and handled and examined for a reasonable length of time, up to even days or weeks in some instances, under visible light with little or no resulting color-transformation of the crystals in the nonimaged area of the element. This property also makes it possible to employ conventional light photography, as with silver halide photographic techniques, to print out and to make prints and copies, negatives or positives, and enlargements of the image on the imaged elements. In elements which have been sensitized by the codeposition of a silver halide, further precautions, such as with conventional light sensitive silver halide materials, must be observed.

A specific advantage of an electron-microscopic polyyne-imaged element arises from its image being capable of optical enlargement to a much greater extent without loss of detail than conventional electron-microscopic silver halide-imaged elements. In electron microscopy a choice of a suitable final magnification must take into account the finest detail to be examined in the recorded image. The final magnification is the product of the instrument magnification and the photographic optical enlargement of the recorded image. Also, because of a maximum frame size instrument limitation in the ordinary electron microscope, the area of the field of view decreases as the inverse square of the instrument magnification, and with conventional electron-microscopic silver halide-imaged elements, an optical enlargement greater than 10×, usually only 4-5, is rarely useful because of obscuring of detail by the grain size. Because of such a limited optical enlargement, the instrument magnification must be of such a magnitude to provide the desired final magnification and accordingly a maximum limitation on the area of the field of view is imposed. In contrast, since the polyyne-imaged element is capable of greater optical enlargement, as high as several orders of magnitude greater, without loss of detail, a smaller instrument magnification can be used to provide the equivalent final magnification, and a significantly larger area of field of view may be examined and studied.

Where the imaged elements are to be retained for lengthy periods, desirably they are stored, as in an envelope or opaque container, in a manner excluding any stray irradiation of radiant energy of a form affecting the element. Alternatively, the initially imaged elements may be fixed or converted to a more stable imaged state. In fixing, the unexposed radiation-sensitive crystalline polyyne is placed in a form in which it is no longer substantially radiation-sensitive, as by solvating it in a suitable solvent, changing it from crystalline to liquid state, or washing it out from the element, and the like. In conversion, the initial irradiation induced color is transformed to another distinctly different color, which is relatively stable as to exposure to the initial form of radiant energy inducing the image formation.

A particularly convenient manner to effect a color transformation of the initially induced image is to carefully heat the imaged element, at atmospheric pressure, to an appropriate elevated temperature, generally between 5°-20° C. less than the melting point of the non-irradiated crystalline radiation-sensitive polyyne, at which the initial radiant-energy induced color-transformed crystals and crystal portions transform to another distinctly different visible color. For example, in elements wherein monomethyl ester of 10,12-docosadiynedioic acid or monomethyl ester of 11,13-tetracosadiynedioic acid is an employed radiation-sensitive crystalline polyyne, there is preferred a brief heating of from a few seconds up to about a minute at temperatures intermediate 50° to 60° C., and desirably not exceeding about 60° C., to effect a color transformation to another distinctly different color (e.g., from the initial radiation-induced blue to purple color to a red to reddish-orange color). Other photosensitive crystalline polyynes also have preferred temperatures for this color transformation by heat, with the preferred maximum temperature being less than the melting point of the unirradiated radiation-sensitive crystalline polyyne. Temperatures approximating and higher than the melting point of the unirradiated radiation-sensitive crystalline polyyne will effect a color transformation of the initial radiant-energy induced colored polyyne crystals, but in so doing there may be some loss in sharpness of the image with some blurring and roughening of the image border or periphery. This can be avoided, or at least minimized, if care is taken that the colored imaged crystal portions are not overcoated or dissolved in melted unexposed polyyne.

Another manner for effecting color transformation of the colored image is exposure to a solvent for the unexposed polyyne. An exposure for about 10 to 15 seconds at an elevated temperature from about 5° to 10° C. lower than employable for heat fixing generally is satisfactory. Methanol, ethanol, toluene, diethyl ether, butyl acetate, carbon tetrachloride, acetone, 2-butoxyethanol, and like solvents are useful. Other useful solvents also will be apparent.

An advantage of the element, having the image thereof in a distinctly different color than the radiation-induced colored image, is that this color may be more susceptible to providing print-out copies with good contrast when prints, negatives and the like of this image are made by conventional silver halide photographic techniques. After fixation by the above techniques, it is possible to overcoat the element by conventional methods with a protective abrasion-resistant overcoating, such as gelatin, to provide additional protection.

The following examples are set forth for purposes of illustration.

EXAMPLE 1

A thin film of the monomethyl ester of 10,12-docosadiyne dioic acid is produced in the following manner. Small samples (approx. 2 in.$^2$) of glass, quartz, a baryta coated paper stock, and a polyfluorocarbon film are mounted on a substrate holder and placed in the bell jar of a conventional vacuum deposition system. A sample of the polyyne, which is impure as indicated by its deep blue color, is placed in a vitreous carbon evaporation boat which is clamped in electrical feed-throughs mounted 15 inches from the substrate holder. The vacuum chamber is closed and evacuated to a pressure of $3 \times 10^{-6}$ torr. The vapor source is carefully heated by passing an electric current through the carbon boat (<10 amperes and <5 volts) until the polyyne is melted. The current through the boat is raised slowly to 10 amperes, at which point the dioic acid ester evaporates readily. The sensor head of an evaporation rate and film thickness monitor, mounted in the plane of the substrate holder, indicates a deposition rate of approximately 20 A. per second, and the evaporation is continued until a film approximately 2000 A. thick is formed, at which point evaporation is stopped by cooling the vapor source. The vacuum chamber is brought up to atmospheric pressure and it is found that an almost clear, colorless coating has formed on all supports. A red-colored residue remains in the evaporation boat. Apparently the red form is produced during heating, while only pure polyyne is evaporated and condensed on the substrate. Care must be taken to heat the evaporant slowly.

When this coating is exposed to radiation of 254 nm., blue photoproduct forms readily. Images are also produced by exposing to an electron beam, in a chamber which is evacuated to $10^{-6}$ torr. The coatings are exposed either with a 14 kv. fine electron beam, written with rasters with or without pictures, or to a 15 kv. broad electron beam for purposes of electron beam sensitometry. Exposure intensities are in the order of $10^{-6}$ to $10^{-7}$ coulombs per square centimeter. The sensitivity of the coatings is equivalent to that of coatings made from an acetone solution of the polyacetylenic composition. However, the images produced by electron beam exposure have greater sharpness and resolving power than those similarly produced on films made by conventional means.

These coatings and that made from acetone solution are stored in the dark under ambient conditions. After storage for two weeks, no visible change is apparent in the evaporated films while the solvent-coated film has turned light blue. Similar coatings prepared on the same supports under the same conditions, 5000 A. and 15,000 A. thick, have the same characteristics. The 5000 A.-thick coating is more sensitive than the 2000 A.-thick coating when exposed to an electron beam, but no additional increase in sensitivity is obtained with the 15,000 A.-thick coating.

EXAMPLE 2

A coating is prepared as described in Example 1, in which the diyne is deposited on a paper support at a coverage of 250 milligrams per square foot. When this coating is exposed for 2 seconds to 254 nm. radiation, at an intensity at the substrate of $5.2 \times 10^{-4}$ watts/cm.$^2$, a blue image is obtained having a net optical density of 0.70. Another coating of the polyacetylenic compound is prepared by conventional means, in which the compound is dispersed in gelatin and coated at a coverage of 400 mg./ft.$^2$ (500 mg. of gelatin/ft.$^2$). When this coating is exposed under the same conditions, an image having an optical density of 0.10 is obtained. To obtain density equal to that which is produced on the evaporated coating in two seconds, a 15-second exposure of the conventionally coated material is required. The image quality in terms of contrast and resolving power is equivalent for the two materials when they are exposed by the electron beam in a cathode ray tube.

EXAMPLE 3

Using the method described in Example 1, coatings approximately 1000 A. thick are deposited on polyester and paper supports, using the following compound:

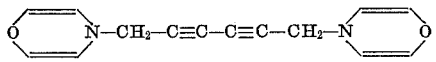

When the deposited films are exposed to 254 nm. radiation for 30 seconds or longer, yellow images form in the layer. Similar images are produced by electron beam exposure as described in Example 1.

EXAMPLE 4

Using the method described in Example 1, coatings approximately 2000 A. thick are deposited on polyester and paper supports, using the following formula compound:

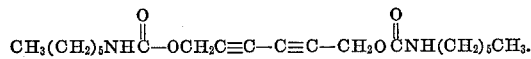

When the deposited film is exposed to 254 nm. radiation for 1 second or more, a magenta image forms in the layer.

EXAMPLE 5

A coating is prepared by depositing the polyacetylenic compound described in Example 1, on samples of a polyester support which had previously been coated with a thin film nickel. The deposited film is approximately 1000 A. thick. Using the same technique, samples of these films are overcoated with a film of thioxanthone or tetrachlorophthalic anhydride, 600 A. thick. All three coatings are exposed to an electron beam as described in Example 1, and it is found that both the thioxanthone and the tetrachlorophthalic anhydride increase the sensitivity of the photosensitive coating.

EXAMPLE 6

Thin films of polyyne coated on plastic supports adhere well, but in themselves are quite soft, and therefore sensitive to abrasion. Accordingly, it would be advantageous if the polyyne coatings could be protected against abrasion. One suitable technique is to overcoat the vapor deposited layer with a thin film of gelatin. Coatings are prepared as in Example 1, in which films of polyacetylenic compound approximately 5000 A. thick are deposited on polyester and paper supports. These coatings are overcoated by dipping in a 2 percent gelatin solution to which is added 2.5 ml. of 10 percent formaldehyde solution per liter. The materials are exposed to 250 nm. radiation, and are found to have approximately 2/10 the sensitivity of non-overcoated samples, probably due to absorption of the radiation by the gelatin. When the samples are exposed to an electron beam as described in Example 1, they have equivalent speed and image quality. The abrasion resistance of the protected layers is satisfactory and better than that of an unprotected film.

EXAMPLE 7

Thin films consisting of a mixture of monomethylester of 10,12-docosadiyne dioic acid and silver bromide are prepared in the following manner. Paper supports and polyester supports are mounted on a support holder and placed in the bell jar of a conventional vacuum deposition system. Two vitreous carbon evaporation boats attached to electrical feed-throughs are mounted adjacent to each other, directly beneath and at a distance of 15 inches from the substrate holder. Each boat may be heated, individually, by passing an electrical current through it using separate power supplies. A compressed pellet of the diyne is place in one boat and pure silver bromide pellets are placed in the other, and the vacuum chamber is evacuated to a pressure of $1 \times 10^{-5}$ torr. The vapor source containing the diyne is carefully heated by passing an electrical current through the carbon boat until the compound is melted, and then the current is increased slowly until evaporation takes place. When the evaporation rate reaches the point where deposition is occurring at a rate of 4 A. per second (as indicated by a resonating quartz crystal deposition thickness and rate monitor), the silver bromide vapor source is rapidly heated (approximately ten seconds required) to the point where the rate of deposition of the silver halide is 0.6 A. per second. Deposition is continued for 160 seconds, at which point a film composed of 20 mg./ft.$^2$ of the diyne and 13 mg./ft.$^2$ of silver bromide has been deposited on the support. The evaporation is stopped, the sources cooled, and the vacuum chamber brought to atmospheric pressure.

The coating is exposed to 254 nm, radiation at an intensity of $4.0 \times 10^{-4}$ watts/cm. and to 365 nm. radiation at an intensity of $5.5 \times 10^{-4}$ watts/cm.$^2$. In each case a blue image is obtained. Optical density for various times is as follows:

| Support | Net optical density | Exposure Time (sec.) | Wavelength (nm.) |
|---|---|---|---|
| Paper | 0.15 | 5 | 254 |
| Do | 0.19 | 10 | 254 |
| Do | 0.14 | 300 | 365 |
| Do | 0.20 | 900 | 365 |

A coating of the diyne alone at the same coverage is unaffected by exposure to 365 nm. radiation for times up to 10 minutes. No visible image forms when a pure silver bromide film at the same coverage is exposed under the same conditions.

EXAMPLE 8

A thin film of diyne and silver bromide is deposited on paper and polyester supports in the same manner as described in Example 7. The film is composed of 77 mg./ft.$^2$ of diyne and 6.4 mg./ft.$^2$ of silver bromide. Blue images are obtained when the samples are exposed to 254 nm. and 365 nm. radiation. The net optical density obtained for various exposures is as follows:

| Support | Net optical density | Exposure Time (sec.) | Wavelength (nm.) |
|---|---|---|---|
| Paper | 0.16 | 2 | 254 |
| Do | 0.47 | 10 | 254 |
| Do | 0.25 | 600 | 365 |
| Polyester | 0.09 | 10 | 254 |
| Do | 0.19 | 30 | 254 |
| Do | 0.10 | 600 | 365 |

Control coatings of the diyne alone on the same supports at a coverage of 81 mg./ft.$^2$ do not change color when exposed to 365 nm. radiation. No visible image forms in a control coating of pure silver bromide at the same coverage, exposed under the same conditions.

EXAMPLE 9

A thin film of diyne and silver iodide is deposited on paper and polyester supports as described in Example 7. The films are composed of 83 mg./ft.$^2$ of diyne, and 6.8 mg./ft.$^2$ of silver iodide. A blue image is obtained when the coating is exposed to radiation of 254 nm., 365 nm., 405 nm. and 500 nm. The net optical density obtained for various exposures is as follows:

| Support | Net optical density | Exposure Time (sec.) | Wavelength* (nm.) |
|---|---|---|---|
| Paper | 0.19 | 2 | 254 |
| Do | 0.36 | 10 | 254 |
| Do | 0.18 | 300 | 365 |
| Do | 0.25 | 600 | 365 |
| Do | 0.30 | 360 | 405 |
| Do | 0.30 | 300 | 500 |
| Polyester | 0.08 | 2 | 254 |
| Do | 0.11 | 10 | 254 |
| Do | 0.07 | 300 | 365 |
| Do | 0.09 | 600 | 365 |

*Radiation intensity not standardized at various wavelengths.

Control coatings of the diyne alone on the same supports at a coverage of 81 mg./ft.$^2$ do not change color when exposed under the same conditions to the 365 nm. and 500 nm. light sources. No visible image forms in a pure silver iodide film at the same coverage exposed under the same conditions.

EXAMPLE 10

A thin film of diyne and silver chloride is deposited on paper and polyester supports as described in Example 7. The film is composed of 65 mg./ft.$^2$ of diyne and 16 mg./ft.$^2$ of silver chloride. A blue image is obtained when the coating is exposed to radiation of 254 nm. and 365 nm. The net optical density obtained for various exposures is as follows:

| Support | Net optical density | Exposure Time (sec.) | Wavelength (nm.) |
|---|---|---|---|
| Paper | 0.20 | 5 | 254 |
| Do | 0.28 | 10 | 254 |
| Do | 0.23 | 300 | 365 |
| Do | 0.28 | 600 | 365 |
| Polyester | 0.10 | 5 | 254 |
| Do | 0.14 | 10 | 254 |
| Do | 0.06 | 300 | 365 |
| Do | 0.11 | 600 | 365 |

Pure silver chloride films which are prepared at the same coverage and exposed under the same conditions form a barely perceptible image. However, at the longest exposure times, the net optical density of the image, which is red-colored, is less than 0.02.

Coatings are also made in which silver bromide or silver chloride are deposited on the support first, followed by a film of diyne at approximately the same coverages as used in this and other examples. In these cases, it is not possible to obtain images using radiation other than that absorbed inherently by the diyne, even at extended exposure times. It appears, therefore, that the homogeneous mixture of diyne and silver halide provided by the coevaporation technique is required to produce the sensitizing effect.

The invention has been described in detail with particular reference to certain preferred embodiments thereof, but it will be understood that variations and modifications can be effected within the spirit and scope of the invention.

We claim:

1. An element comprising a support and a vacuum vapor deposited layer of a radiation-sensitive polyacetylenic compound.

2. An element as set forth in Claim 1, wherein said polyacetylenic compound has a minimum of two acetylenic linkages as a conjugated system.

3. An element as set forth in Claim 1, wherein said polyacetylenic compound is selected from the group consisting of lower alkyl esters of dioic acids, polyacetylenic polyoic acid alkylamides, polyacetylenic amine salts, and diyne diol urethanes.

4. An element as set forth in Claim 1, wherein said polyacetylenic compound is the monomethyl ester of 10,12-docosadiyne dioic acid.

5. An element as set forth in Claim 1, further comprising an abrasion resistant overcoating layer.

6. An element as set forth in Claim 5, wherein said overcoating layer comprises gelatin.

7. An element as set forth in Claim 1, further comprising a photo sensitizing compound.

8. An element comprising a support and a vacuum vapor codeposited layer of a radiation-sensitive polyacetylenic compound and a photosensitizing compound.

9. An element as set forth in Claim 8, wherein said photosensitizing compound is a silver halide.

10. An element as set forth in Claim 9, wherein said silver halide is present in a proportion of from about 5% to about 100% by weight of the polyacetylenic compound.

11. An element as set forth in Claim 1, wherein said vacuum vapor deposited layer is from about 250 A. to about 15,000 A. thick.

12. An element as set forth in Claim 1, wherein said vacuum vapor deposited layer is from about 1000 A. to about 6000 A. thick.

13. An element comprising a support and a vacuum vapor deposited layer of a radiation-sensitive lower alkyl ester of a polyacetylenic dioic acid.

14. An element as set forth in Claim 13, wherein a photosensitizing compound is vacuum vapor codeposited with said polyacetylenic acid ester.

15. An element as set forth in Claim 14, wherein said ester is the monomethyl ester of 10,12-docosadiyne dioic acid.

16. An element as set forth in Claim 14, wherein said photosensitizing compound is a silver halide.

17. An element as set forth in Claim 16, wherein said silver halide is selected from the group consisting of silver chloride, silver bromide, and silver iodide.

18. An element comprising a support and a vacuum vapor deposited layer of a radiation-sensitive alkylamide polyacetylenic compound.

19. An element as set forth in Claim 18, wherein a photosensitizing compound is vacuum vapor codeposited with said polyacetylenic compound.

20. An element as set forth in Claim 19, wherein said alkylamide is selected from the group consisting of methyl 21-[N-(3 - carboxypropyl) carbamoyl]-10,12-heneicosadiyne; methyl 21-[N-(3-hydroxypropyl) carbamoyl]-10,12-heneicosadiynoate; and methyl 21-[N-(2-carboxypropyl) carbamoyl]-10,12-heneicosadiynoate.

21. An element as set forth in Claim 19, wherein said photosensitizing compound is a silver halide.

22. An element comprising a support and a vacuum vapor deposited layer of a radiation-sensitive polyacetylenic amine salt.

23. An element as set forth in Claim 22, wherein a photosensitizing compound is vacuum vapor codeposited with said polyacetylenic amine salt.

24. An element as set forth in Claim 23, wherein said amine salt is hexylammonium 20-(N-hexylcarbamoyl)-9,11-eicosadiyn-1-carboxylate.

25. An element as set forth in Claim 23, wherein said amine salt is propylammonium 20-(N-propylcarbamoyl)-9,11-eicosadiyne-1-carboxylate.

26. An element as set forth in Claim 23, wherein said photosensitizing compound is a silver halide.

27. An element as set forth in Claim 26, wherein said silver halide is selected from the group consisting of silver chloride, silver bromide, and silver iodide.

28. An element comprising a support and a vacuum vapor deposited layer of a radiation-sensitive polyacetylenic bis urethane.

29. An element as set forth in Claim 28, wherein a photosensitizing compound is vacuum vapor codeposited with said polyacetylenic bis urethane.

30. An element as set forth in Claim 29, wherein said urethane is 2,4-hexadiyne-1,6-diol bis(N-hexylurethane).

31. An element as set forth in Claim 29, wherein said photosensitizing compound is a silver halide.

32. A method for the preparation of elements which comprises vacuum vapor depositing upon a support crystals of a radiation-sensitive polyacetylenic compound.

33. A method as set forth in Claim 32, wherein said polyacetylenic compound has a minimum of two acetylenic linkages as a conjugated system.

34. A method as set forth in Claim 32, wherein said polyacetylenic compound is selected from the group consisting of lower alkyl esters of dioic acids, polyacetylenic polyoic acid alkylamides, polyacetylenic amine salts, and diyne diol urethanes.

35. A method as set forth in Claim 33, which comprises simultaneously vacuum vapor depositing upon a support crystals of said polyacetylenic compound and a photosensitizing compound.

References Cited
UNITED STATES PATENTS

| | | | |
|---|---|---|---|
| 3,501,297 | 3/1970 | Cremeans | 96—88 |
| 2,945,771 | 7/1960 | Mansfeld | 117—34 |

ALFRED L. LEAVITT, Primary Examiner

J. W. MASSIE, Assistant Examiner

U.S. Cl. X.R.

96—67, 88, 114.1; 117—34, 72, 92, 106 R

PO-1050
(5/69)

UNITED STATES PATENT OFFICE
CERTIFICATE OF CORRECTION

Patent No. 3,822,134     Dated July 2, 1974

Inventor(s) Arthur A. Rasch and Wilbur C. Hodges

It is certified that error appears in the above-identified patent and that said Letters Patent are hereby corrected as shown below:

Column 2, line 68, "polyacetylene" should read --polyacetylenic--.

Column 4, line 18, "surface" should read --surfaced--.

Column 9, line 70 after "film" and before "nickel" insert --of--.

Column 10, line 37, "place" should read --placed--.

Column 12, line 39 (Claim 7) "photo sensitizing" should read "photosensitizing".

Column 13, line 3, "N-(2-" should read "N-(3-"; Line 15, (Claim 24) "eicosadiyn" should read --eicosadiyne--.

Signed and sealed this 3rd day of June 1975.

(SEAL)
Attest:

RUTH C. MASON
Attesting Officer

C. MARSHALL DANN
Commissioner of Patents
and Trademarks